(12) United States Patent
Drucker

(10) Patent No.: US 8,619,986 B2
(45) Date of Patent: Dec. 31, 2013

(54) SYSTEMS AND METHODS FOR SECURE COMMUNICATION USING A COMMUNICATION ENCRYPTION BIOS BASED UPON A MESSAGE SPECIFIC IDENTIFIER

(75) Inventor: Steven J. Drucker, Atlanta, GA (US)

(73) Assignee: Patton Protection Systems LLC, Atlanta, GA (US)

( * ) Notice: Subject to any disclaimer, the term of this patent is extended or adjusted under 35 U.S.C. 154(b) by 109 days.

(21) Appl. No.: 13/188,225

(22) Filed: Jul. 21, 2011

(65) Prior Publication Data

US 2013/0024686 A1 Jan. 24, 2013

(51) Int. Cl.
 H04K 1/00 (2006.01)
 H04L 9/32 (2006.01)
(52) U.S. Cl.
 USPC ............................ 380/255; 713/170; 713/171
(58) Field of Classification Search
 USPC .............. 713/150, 170, 171, 181; 380/1, 202, 380/225, 255, 264, 37, 42; 707/613, 687, 707/708; 725/31, 32; 717/143; 370/252, 370/349; 719/313
 See application file for complete search history.

(56) References Cited

U.S. PATENT DOCUMENTS

| | | | |
|---|---|---|---|
| 5,606,609 A | 2/1997 | Houser et al. |
| 6,584,562 B1 | 6/2003 | Olkin et al. |
| 7,380,124 B1 | 5/2008 | Mizell et al. |
| 2002/0016922 A1 | 2/2002 | Richards et al. |
| 2003/0081785 A1 | 5/2003 | Boneh et al. |
| 2003/0147536 A1 | 8/2003 | Andivahis et al. |
| 2003/0196080 A1 | 10/2003 | Karman |
| 2005/0123137 A1 | 6/2005 | McCallum |
| 2006/0005017 A1 | 1/2006 | Black et al. |
| 2006/0075228 A1 | 4/2006 | Black et al. |
| 2007/0086590 A1 | 4/2007 | Blom |
| 2007/0156783 A1 | 7/2007 | Zbogar-Smith et al. |
| 2007/0192176 A1 | 8/2007 | Onischuk |
| 2008/0086646 A1 | 4/2008 | Pizano |

(Continued)

OTHER PUBLICATIONS

Swiss Post's "IncaMail", http://www.post.ch/en/post-startseite/post-incamail-home.thm (retrieved on Mar. 7, 2011).

(Continued)

*Primary Examiner* — Darren B Schwartz
*Assistant Examiner* — Leynna Truvan
(74) *Attorney, Agent, or Firm* — Withers & Keys, LLC

(57) ABSTRACT

An apparatus and methods of securely communicating a message between a first device and a second device using a message specific identifier is disclosed. The method begins by receiving an encryption key request from a sending device, where the encryption key request is based upon the message specific identifier, which is associated with a plurality of attributes associated with the message and the sending device. In more detail, the message specific identifier may be an information-based indicator that is unique with respect to the message and the sending device. The method parses the encryption key request and the message specific identifier to provide an intermediate argument used to enter a current random character set that is periodically generated and stored into memory. The intermediate argument helps identify which type of encryption method is desired for use in encryption key generation. An encryption key is constructed using the intermediate argument as an entry point to the current random character set. A data structure is stored associated with the message specific identifier, a random character set identifier for the current random character set, and an identifier of the encryption method used before the key is transmitted back to the device.

20 Claims, 7 Drawing Sheets

(56) References Cited

U.S. PATENT DOCUMENTS

| | | |
|---|---|---|
| 2008/0107271 A1 | 5/2008 | Mergen |
| 2008/0267399 A1 | 10/2008 | Medvinsky |
| 2009/0077374 A1* | 3/2009 | Schwarz et al. .............. 713/156 |
| 2009/0287922 A1 | 11/2009 | Herwono et al. |
| 2010/0034385 A1* | 2/2010 | Gantman et al. .............. 380/268 |
| 2010/0257352 A1 | 10/2010 | Errico |
| 2011/0225407 A1 | 9/2011 | Nelson et al. |
| 2012/0084570 A1 | 4/2012 | Kuzin et al. |

OTHER PUBLICATIONS

International Search Report and Written Opinion for related PCT International Application No. PCT/US2012/44894, dated Sep. 17, 2012.

U.S. Appl. No. 13/716,427 Final Office Action mailed Jun. 25, 2013.
U.S. Appl. No. 13/716,427 Office Action dated Mar. 18, 2013.

* cited by examiner

SYSTEMS AND METHODS FOR SECURE COMMUNICATION USING A COMMUNICATION ENCRYPTION BIOS BASED UPON A MESSAGE SPECIFIC IDENTIFIER

FIELD OF THE DISCLOSURE

The present disclosure relates to systems, apparatus and methods in the field of secure and encrypted communications and, more particularly, for improved apparatus, systems and methods of secure communication using a communication encryption BIOS based upon a message specific identifier.

BACKGROUND

The desire to securely communicate is rooted in the need for confidentiality and secrecy. This need to communicate in a secure manner reaches into and is involved in many aspects of society and industry. Indeed, communicating via an electronic medium poses a variety of increased threats and compromises that may expose some methods of communication to the potential loss of confidentiality or rendering the communication unsecure.

Using trusted and private networks may help improve the security of communications, but use of such controlled communication pathways is often costly and frequently impractical. Thus, computing and communication devices, such as personal computers, smart phones, radios, intelligent appliances, and other microprocessor-based communication equipment, often transmit information over untrusted networks but still desire the need to communicate information securely. Users of such devices strive to maintain the security and proprietary nature of communications in a variety of conventional ways, but there remains a further need to securely communicate between devices using an untrusted network.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a method of securely communicating a message between a first device and a second device using a message specific identifier. The method begins by assembling the message specific identifier from one or more attributes associated with the message and the first device. The attributes may include at least one from the group comprising a hardware address associated with the first device, a sending address, a recipient address, a chronological attribute, a user ID attribute, a password attribute, and a processing unit component ID attribute. Assembling the message specific identifier may involve creating a hash of the attributes to form an information-based indicator that is unique with respect to the message and the first device.

The method then transmits an encryption key request to a server, wherein the encryption key request is based upon the message specific identifier. Next, an encryption key is received from the server, wherein the encryption key is based on the message specific identifier and a random character set. The message is encrypted using the key and the key is destroyed before sending the encrypted message to the second device.

In another aspect of the disclosure, another method is described for securely communicating a message between a first device and a second device using a message specific identifier. The method begins by receiving the encrypted message and the message specific identifier from the first device by the second device, the message specific identifier being associated with one or more attributes associated with the message and the first device. The method transmits a decryption key request to a server in communication with the second device. The decryption key request is based upon the message specific identifier received and a second device attribute, such as a device specific hardware identifier or, more specifically, the second device's MAC address together with the second device's validated user information such as one or several of a user ID, password and other validation information components such as are readily known to those practiced in the art. Next, the decryption key is received from the server, wherein the decryption key is based on the message specific identifier and a stored random character set maintained on the server. The encrypted message may then be decrypted with the key.

In yet another aspect of the disclosure, another method is described for securely communicating a message between a first device and a second device using a message specific identifier. The method begins by receiving an encryption key request from the first device, wherein the encryption key request is based upon the message specific identifier associated with a plurality of attributes associated with the message and the first device. Next, the method parses the encryption key request and the message specific identifier to provide an intermediate argument used to enter a current random character set that is periodically generated and stored into memory. The intermediate argument is associated with an entry point in the current random character set. An encryption key is then constructed from the current random character set and the entry point of the current random character set associated with the intermediate argument. The method then stores a data structure associated with the message specific identifier and a random character set identifier associated with the current random character set before transmitting the encryption key to the first device.

And in yet another aspect of the disclosure, a method is described for securely communicating a message between a first device and a second device using a message specific identifier. The method begins by receiving an encryption key request from the first device, wherein the encryption key request is based upon the message specific identifier associated with a plurality of attributes associated with the message and the first device. Next, the method parses the encryption key request and the message specific identifier to provide an intermediate argument used to specify one of a plurality of BIOS resident encryption key construction paradigms. An encryption key is then constructed from the current random character set and the BIOS resident encryption key construction paradigm. The method then stores a data structure associated with the message specific identifier, the current random character set identifier and the specified BIOS resident encryption key construction paradigm before transmitting the encryption key to the first device.

The method may further include receiving from the second device a decryption key request and a second device attribute, such as the second device's MAC address and/or together with the second device's validated user information, such as one or several of a user ID, password and other validation information components such as are readily known to those skilled in the art, and where the decryption key request is based upon the message specific identifier. After determining whether the decryption key request is valid based upon the second device attribute, the method may access the recorded data structure to locate the random character set identifier based upon the message specific identifier. The method may then construct a decryption key from the random character set associated with the located random character set identifier and transmit the constructed decryption key to the second device.

Another aspect of the disclosure involves an apparatus for securely communicating a message between a plurality of devices using a message specific identifier and a server coupled to the devices. The apparatus comprises a processing unit within the server, volatile memory coupled to the processing unit, a data communications interface coupled to the processing unit and a memory storage also coupled to the processing unit. The data communication interface is in operative communication with the devices and provides an encryption key request and a decryption key request to the processing unit upon respective receipt of such requests from one of the devices. The encryption key request and the decryption key request are based upon the message specific identifier, which is associated with a plurality of attributes associated with the message and a sending one of the devices. The memory storage maintains a secure communications management module and a plurality of random character sets. Each of the random character sets is periodically generated by the secure communications management module and stored on the memory storage.

The processing unit is configured, when executing the secure communication management module, to respond to the encryption key request and decryption key request. More specifically, in response to the encryption key request, the processing unit is operative to parse the encryption key request and the message specific identifier to provide an intermediate argument used to enter a current one of the random character sets maintained on the memory storage, where the intermediate argument associated with an entry point in the current one of the random character sets; to parse the encryption key request and the message specific identifier to provide an intermediate argument used to specify one of a plurality of BIOS resident encryption key construction paradigms; and to construct an encryption key from the current one of the random character sets and the entry point of the current one of the random character sets associated with the intermediate argument and the specified BIOS resident encryption key construction paradigm; record a data structure on the memory storage, where the data structure is associated with the message specific identifier and a random character set identifier associated with the current one of the random character sets and an identifier of the specified BIOS resident encryption key construction paradigm; and provide the encryption key to the data communication interface and cause the encryption key to be transmitted to the one of the devices that sent the encryption key request.

The processing unit is further operative, in response to the decryption key request, to determine whether the decryption key request is valid. If the decryption key request is determined to be valid, the processing unit is further operative to access the stored data structure on the memory storage to locate the random character set identifier and identifier of the relevant BIOS resident encryption key construction paradigm based upon the message specific identifier; construct a decryption key from the relevant BIOS resident encryption key construction paradigm and the one of the random character sets associated with the located random character set identifier; and provide the constructed decryption key to the data communication interface and cause the decryption key to be transmitted to the another of the devices that send the decryption key request.

Additional advantages of this and other aspects of the disclosed embodiments and examples will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

DESCRIPTION OF THE EMBODIMENTS

Figure 1A:
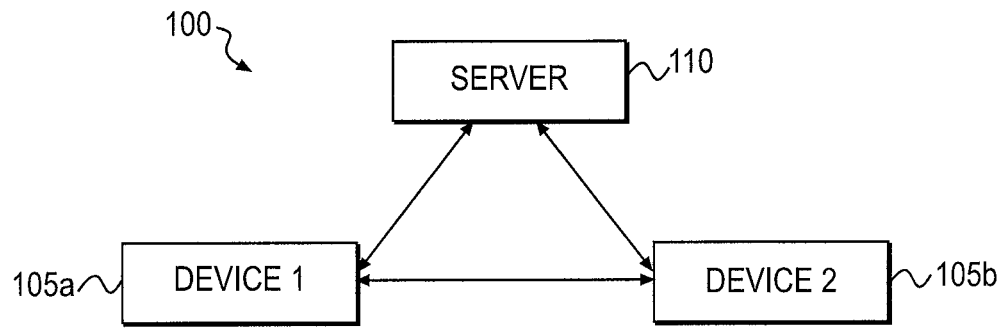
FIGS. 1A-1C are exemplary block diagrams of exemplary configurations of a server and two devices in communication with each other in accordance with an embodiment of the invention.

Reference will now be made in detail to exemplary embodiments. Wherever possible, the same reference numbers are used in the drawings and the description to refer to the same or like parts.

In general, the following describes various embodiments of systems and methods for securely communicating between two devices using a message specific identifier are described herein. The devices may communicate a message directly with each other and generally make requests of a server when creating, encrypting and sending the message and/or when receiving, decrypting, and reading the message. As such, one aspect of an embodiment has encryption and decryption key construction being organic and specific to the particular message being encrypted or to be decrypted. More specifically, an embodiment may create a hash of particular message attributes to form an information-based indicator that is unique with respect to the message, and that indicator (more generally referenced as a message specific identifier) is used as part of encryption/decryption key construction as opposed to a server arbitrarily assigned key and or an equally arbitrarily assigned server originated message identifier.

One of skill in the art will appreciate that, generally, a device is considered herein as a communication component. Examples of such a device may be a computer, radio, or other processor-based component or appliance of a larger system that requires or desires components to securely communicate over untrusted networks. Further examples of devices include, but are not limited to, cell phones, smart phones, computers, laptops, other handheld devices (such as a PDA or tablet), televisions, or any other processor-based appliances that allow a user to formulate messages and communicate that message with a server and another user on another device.

Figure 1B:
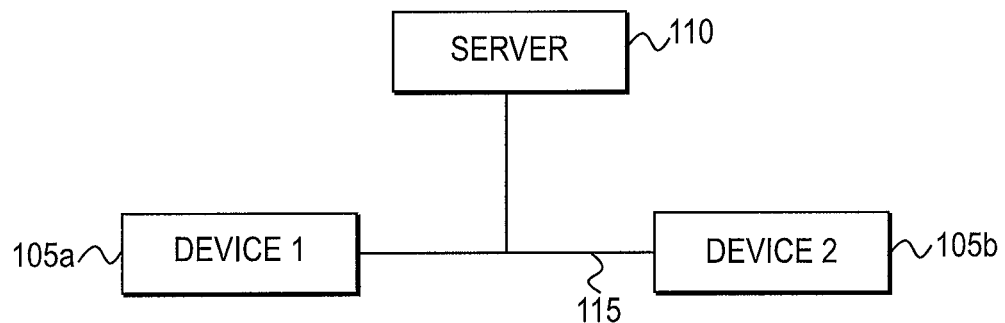
Figure 1C:
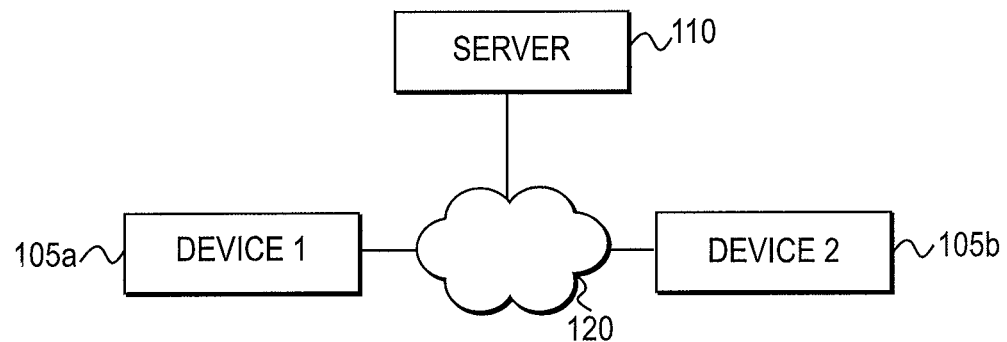

FIGS. 1A-1C are block diagrams of exemplary configurations of a server and two devices in communication with each other in accordance with different embodiments of the invention. Referring now to FIG. 1A, a first configuration 100 is disclosed that includes two devices 105a, 105b and a server 110. Devices 105a, 105b are shown in direct communication with each other while server 110 is shown having independent communication paths to each of device 105a and device 105b. FIG. 1B illustrates an alternative configuration, such as a local data communication network, where each of device 105a, device 105b and server 110 are coupled to a network or other data communication bus 115 at specific points. FIG. 1C illustrates yet a further configuration where the network 120, which communicatively couples (i.e., allows communication between devices or the server), is implemented in a less formal network or data communication topology, such as the Internet.

However, in each of these device/server configurations, the communicating entities are set up so that one device may send a signal to another device or to the server. In this manner, the server may be used to facilitate communication of a message from one device to the other device. Communication may be implemented in these configurations over a variety of communication networks or paths involving hard wired structures (e.g., telecommunication lines, telecommunication support structures and telecommunication processing equipment, etc.), wireless structures (e.g., antennas, receivers, repeaters, etc.) and a combination of both depending upon the desired implementation of a communication system that may employ an embodiment of the present invention.

Figure 2:
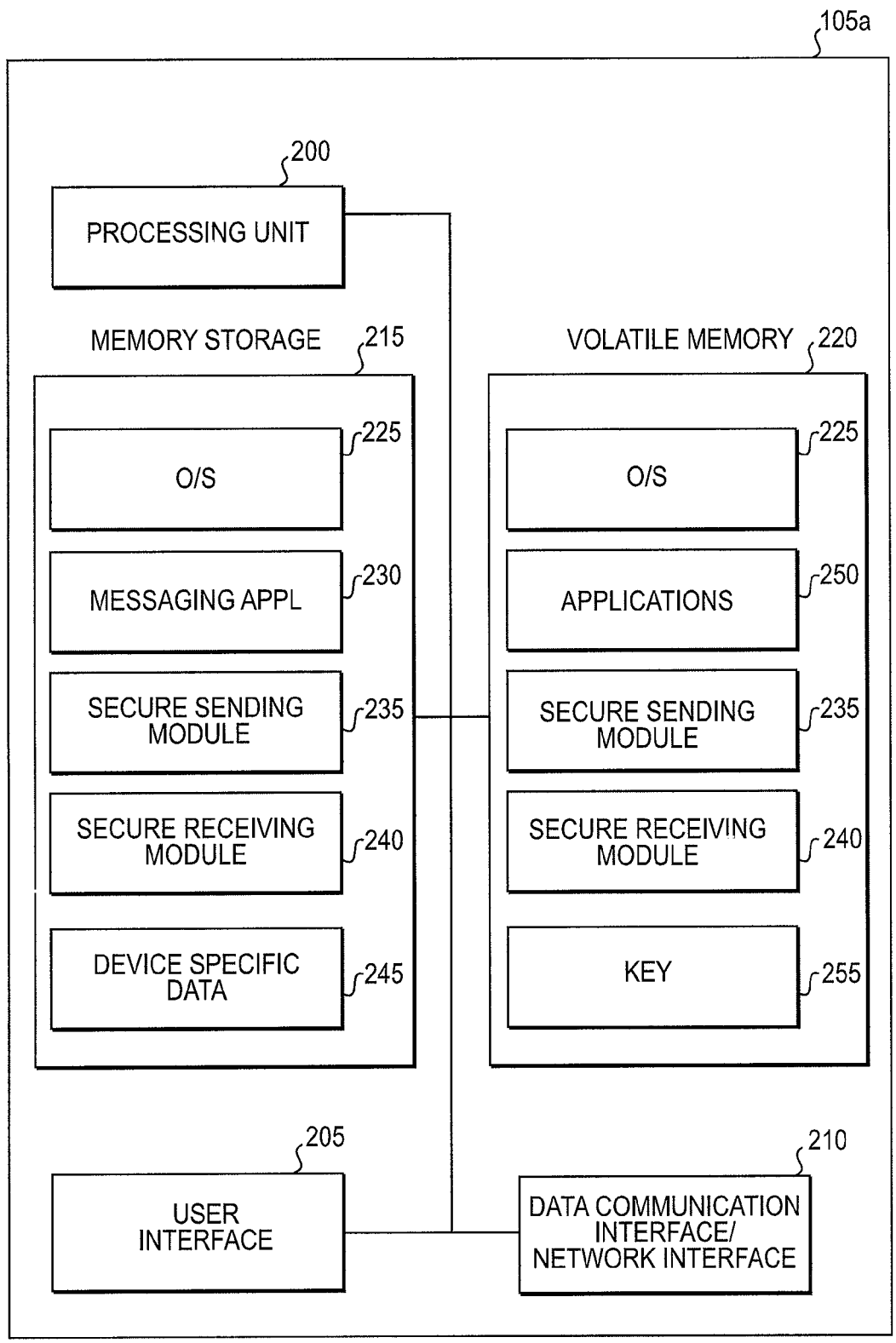
FIG. 2 is a more detailed diagram illustrating exemplary hardware and software components within a device used for communication as shown in FIGS. 1A-1C.

FIG. 2 is a more detailed diagram illustrating exemplary hardware and software components within an exemplary device used for communication as shown in FIGS. 1A-1C. Referring now to FIG. 2, exemplary device 105a is shown in more detail as several coupled components comprising a processing unit 200, a user interface 205, data communication interface/network interface 210, memory storage 215 and volatile memory 220. In general, processing unit 200 performs basic and complex computations and executes operational and application program code and other program modules within the device 105a. User interface 205, coupled to the processing unit 200, allows a user of the device to enter information, such as the content of a message to be sent to another user. Data communication interface/network interface 210 is coupled to the processing unit 200 and may include other hardware (not shown) for operatively coupling the device to a specific communication path, such as a transmitter and antenna for coupling device 105a to a wireless communication path or a LAN/Ethernet interface card for coupling device 105a to a wired local area network, such as network 115 of FIG. 1B.

Volatile memory 220 and memory storage 215 are each coupled to the processing unit 200 as well. Both memory components provide elements used by processing unit for maintaining and storing information and data used when securely communicating with other devices. In the embodiment shown in FIG. 2, memory storage 215 maintains a variety of program code (e.g., operating system 225, messaging application 230, secure sending module 235, and secure receiving module 240) and other data (e.g., device specific data, which may include a device specific hardware identifier such as a media access control (MAC) address). Memory storage 215 is a computer readable medium on which information (e.g., executable code/modules, user data, stored messages, etc.) may be kept in a non-volatile manner. Examples of such memory storage 215 may include a hard disk drive, ROM, flash memory or other media structure that allows longer term storage of information. In contrast, volatile memory 220 is typically a random access memory (RAM) structure used by processing unit 200 during operation of the device. In the embodiment of FIG. 2, volatile memory 220 is populated after boot-up of the device 105a with an instance of operating system 225, various applications 250 (such as messaging application 230), and program modules that help facilitate securely communicating with other devices (e.g., secure sending module 235 and secure sending module 240). As will be explained in more detail below and herein, volatile memory 220 may also maintain a key 255, which is typically not stored in memory storage 215 and may be in the form of an encryption key (when sending a message and using the secure sending module 235) or the form of a decryption key (when decrypting a message received using the secure receiving module 240).

During relevant operation of device 105a shown in FIG. 2, messaging application 230 operates as a software application that creates and transmits a message to another device and that receives a message from another device. In the embodiment illustrated, messaging application 230 interfaces with the secure sending module 235 when creating and transmitting the message and interfaces with the secure receiving module 240 when receiving and decrypting the message from another device. Secure sending module 235 and secure receiving module 240 may be implemented as distinct program code modules with respect to the messaging application or may be integrated within the messaging application itself.

In the illustrated embodiment of FIG. 2, modules 235 and 240 gather information in the form of message and particular device attributes, and provide access to a server using a message specific identifier created from the message and device attributes. The server access provided by these modules 235, 240 facilitates key generation and provides either an encryption key with module 235 or a decryption key with module 240 from the server.

In other embodiments, such as the embodiment illustrated in FIG. 7 and described in more detail below, modules 235 and 240 may be implemented in lower level software/firmware (e.g., BIOS interface sending module 735 and BIOS receiving module 740, respectively) operating within device 105a. Such lower level software/firmware modules may be implemented as a BIOS level of functionality that controls certain basic functions within the device. In other embodiments, one skilled in the art will appreciate that similar functionality may be implemented in specially optimized hardware (e.g., a particular application specific integrated circuit (ASIC) having the same functionality as secure sending module 235 and secure receiving module 240), discrete logic, or a combination of hardware and firmware depending upon requirements of the device, such as power, processing speed, cost, space, etc.

Figure 3:
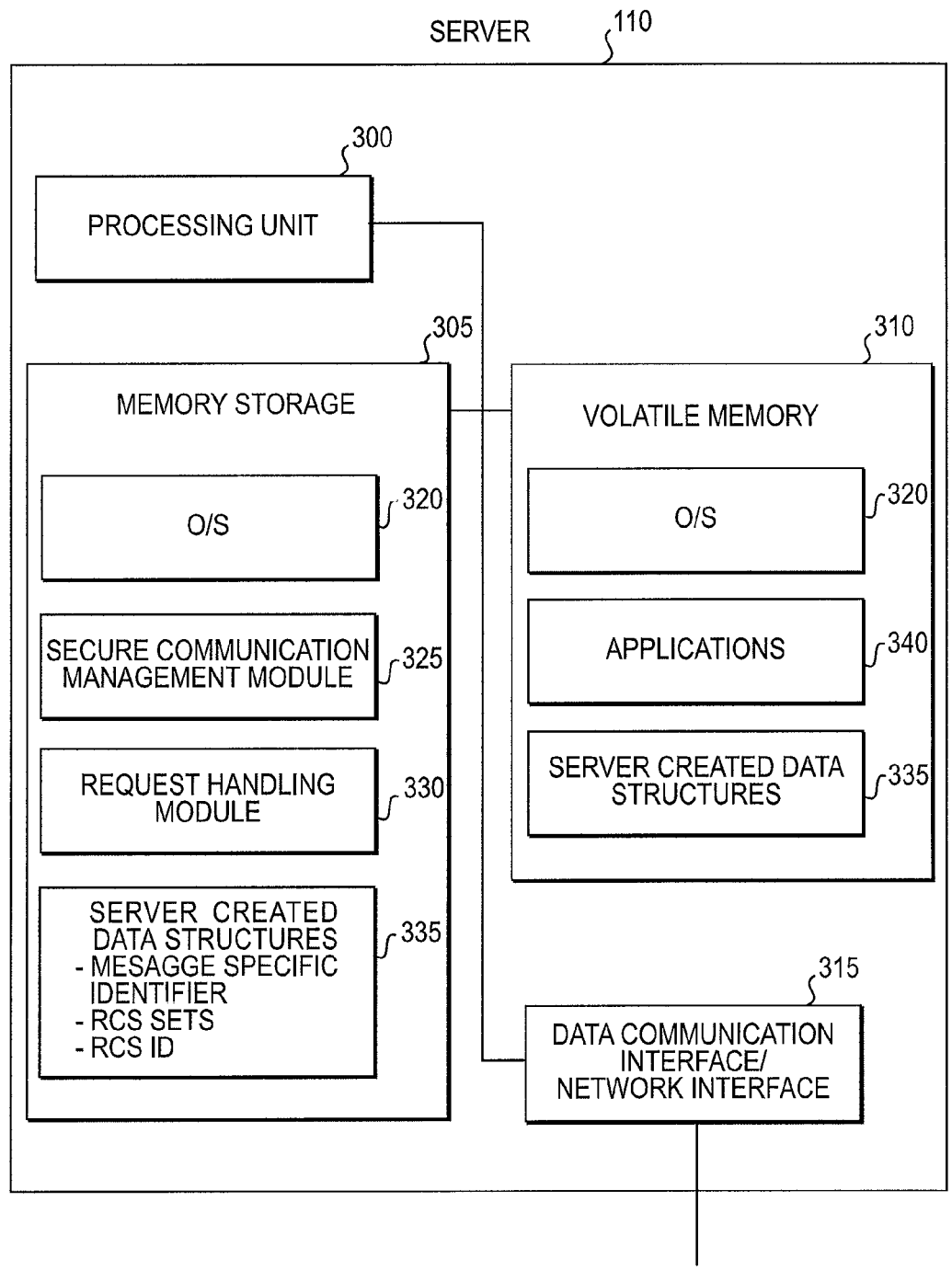
FIG. 3 is a more detailed diagram illustrating exemplary hardware and software components within a server used for communication as shown in FIGS. 1A-1C.

FIG. 3 is a more detailed diagram illustrating exemplary hardware and software components within a server used for communication as shown in FIGS. 1A-1C. Referring now to FIG. 3, exemplary server 110 is shown in more detail as several coupled components comprising a processing unit 300, a data communication interface/network interface 315, memory storage 305 and volatile memory 310. Those skilled in the art will appreciate that exemplary server 110 may be implemented with a single processor or may be implemented as a multi-processor component that communicates with devices, such as device 105a or device 105b. Server 110 may be implemented as a distributed server or server farm that logically allows multiple distinct components to function as a server from the perspective of the device (e.g., device 105a or 105b). Likewise, while the embodiment shown in FIG. 3 illustrates a single memory storage 305, exemplary server 110 may deploy more than one memory storage media and do so in differing forms (e.g., conventional hard disk drives, solid state memory such as flash memory, optical drives, RAID systems, cloud storage configured memory, network storage appliances, etc.).

In general, processing unit 300 performs basic and complex computations and executes operational and application program code and other program modules within the server 110. While not shown in the illustrated embodiment, server 110 may include a user interface, such as an input device (e.g., keyboard, mouse, tablet) and a display unit. Data communication interface/network interface 315 is coupled to the processing unit 300 and may include other hardware (not shown) for operatively coupling the server to particular devices and networks.

Processing unit 300 is coupled to volatile memory 310 and memory storage 305. Both memory components associated with server 110 provide elements used by the processing unit 300 for maintaining and storing information and data used when facilitating requests from devices when securely communicating between devices. In the embodiment shown in FIG. 3, memory storage 305 maintains a variety of program code (e.g., operating system 320, request handling module 330, secure communication management module 325) and other server created data structures (e.g., current and previous random character sets, message specific identifiers for particular messages and identifiers for particular random character sets). Like memory storage 215, memory storage 305 is a computer readable medium on which information (e.g., executable code/modules, data structures, etc.) may be kept in a non-volatile manner.

Volatile memory 310 is typically a RAM structure used by processing unit 300 during operation of the server. In the embodiment of FIG. 3, volatile memory 310 is populated after boot-up of the server 110 with an instance of operating system 320, various applications 340 (such as request routing module 330 and secure communication management module 325), and data and other server created data structures 335. During operation of exemplary server 110, request routing module 330 operates to received a key request and validate the request, while the secure communication management module 325 is responsible for encryption/decryption key generation for valid requests. For example, request routing module 330 may receive an encryption key request from a device and, as a level of security, determine if the request is valid. This may be done by reviewing the received message specific identifier provided as part of the encryption key request. Once the request routing module 330 confirms the request is valid and from a registered device, the request is then handled by the secure communication management module 325 at a lower level. As such, the embodiment of FIG. 3 implements modules 325 and 330 in a layered approach, but those skilled in the art will appreciate that other embodiments may implement request handling, validation, and encryption/decryption key construction in a single module or with other software code sections.

In other embodiments, such as the embodiment illustrated in FIG. 7 and described in more detail below, modules 325 and 330 may be implemented as part of lower level software/firmware (e.g., BIOS software 725) operating within Communications Encryption Server 110. As with other embodiments, one skilled in the art will appreciate that similar functionality in server 110 may be implemented in specially optimized hardware (e.g., a particular application specific integrated circuit (ASIC) having the same functionality as modules 325 and 330), discrete logic, or a combination of hardware and firmware depending upon requirements of the server, such as power, processing speed, number of processors, number of memory storage units coupled to the processor(s), cost, space, etc.

Figure 4:
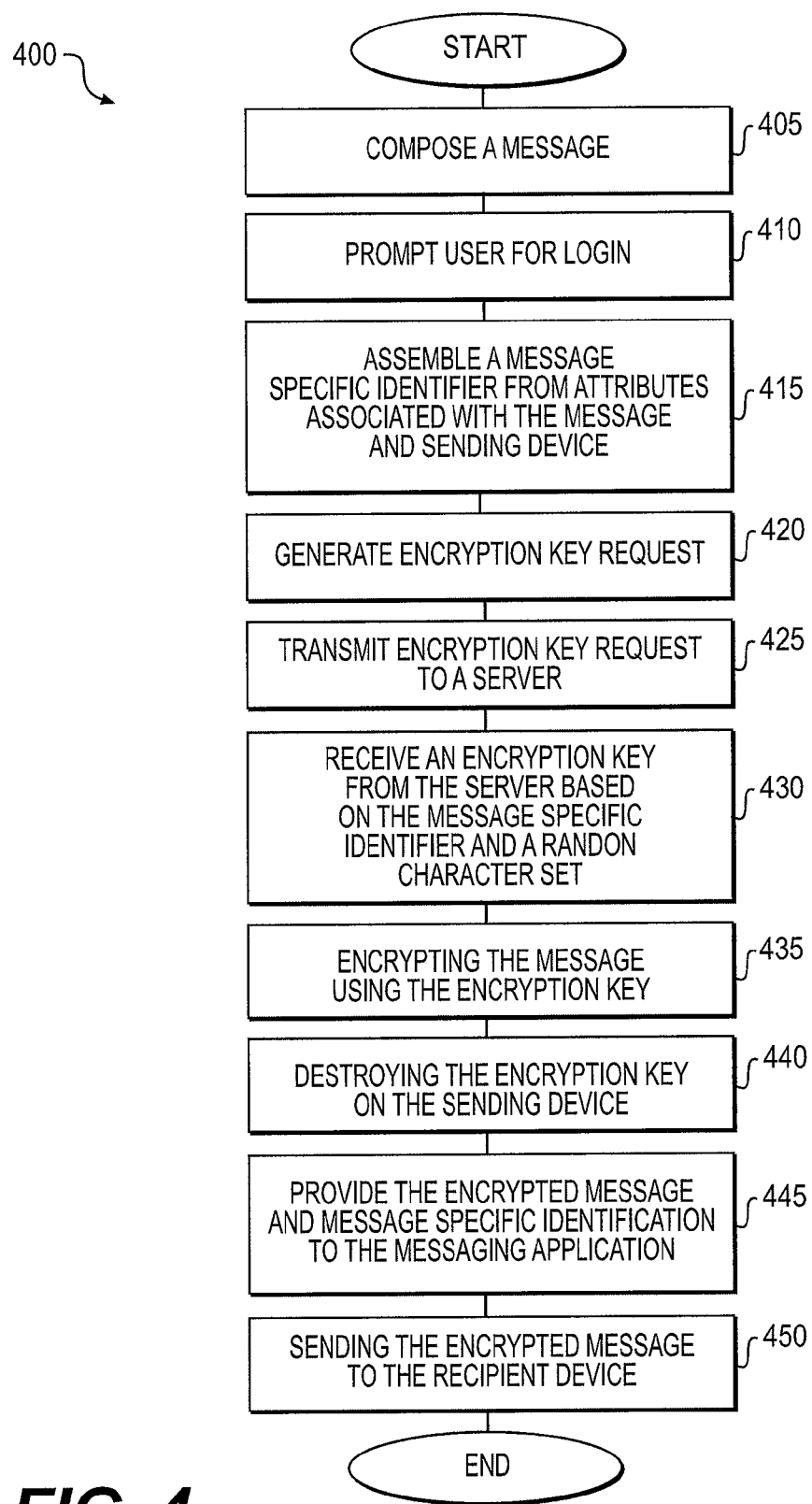
FIG. 4 is a flowchart diagram illustrating exemplary steps of a method performed by a sending device when a message is generated and sent in a secure manner in accordance with an embodiment of the invention.
Figure 5:
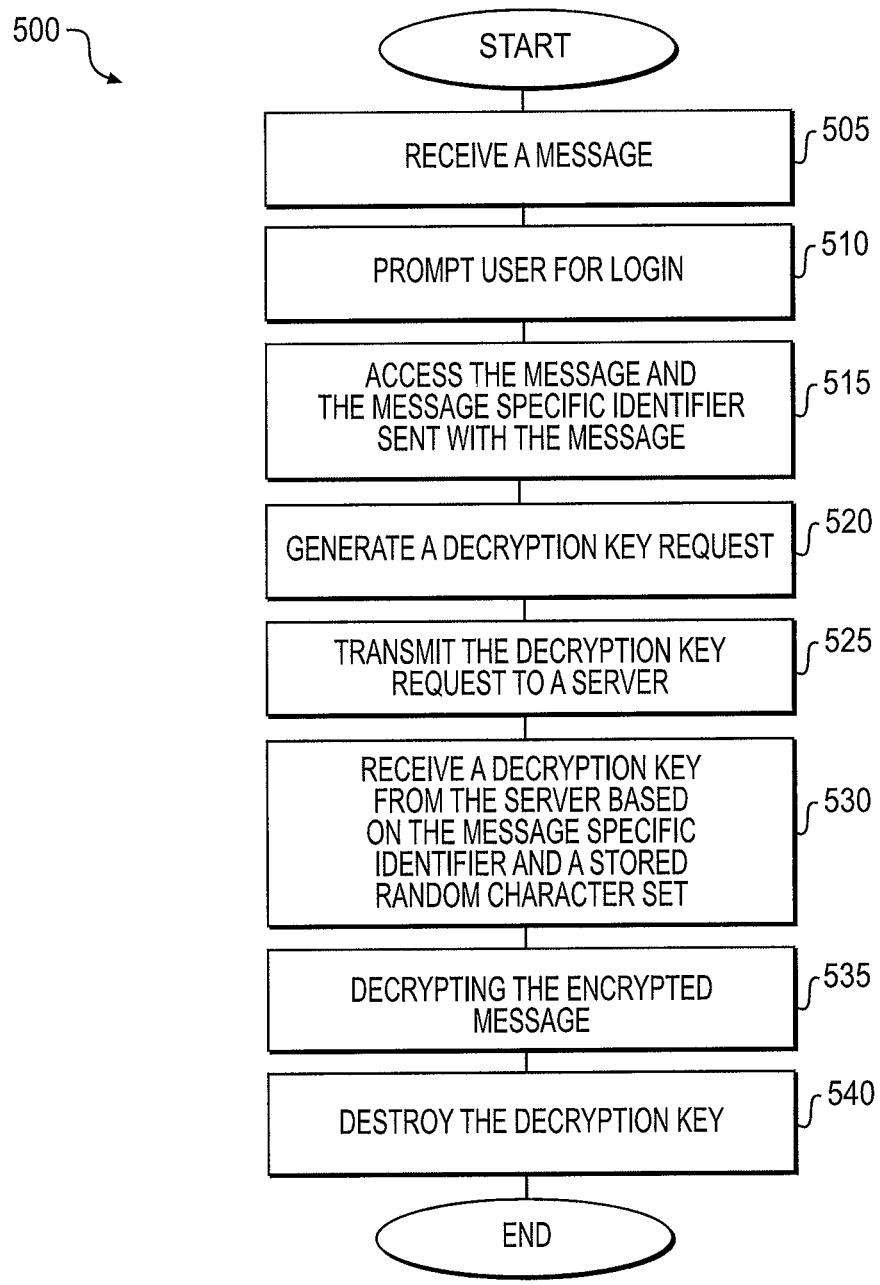
FIG. 5 is a flowchart diagram illustrating exemplary steps of a method performed by a receiving device when a message is received and to be decrypted in a secure manner in accordance with an embodiment of the invention.
Figure 6:
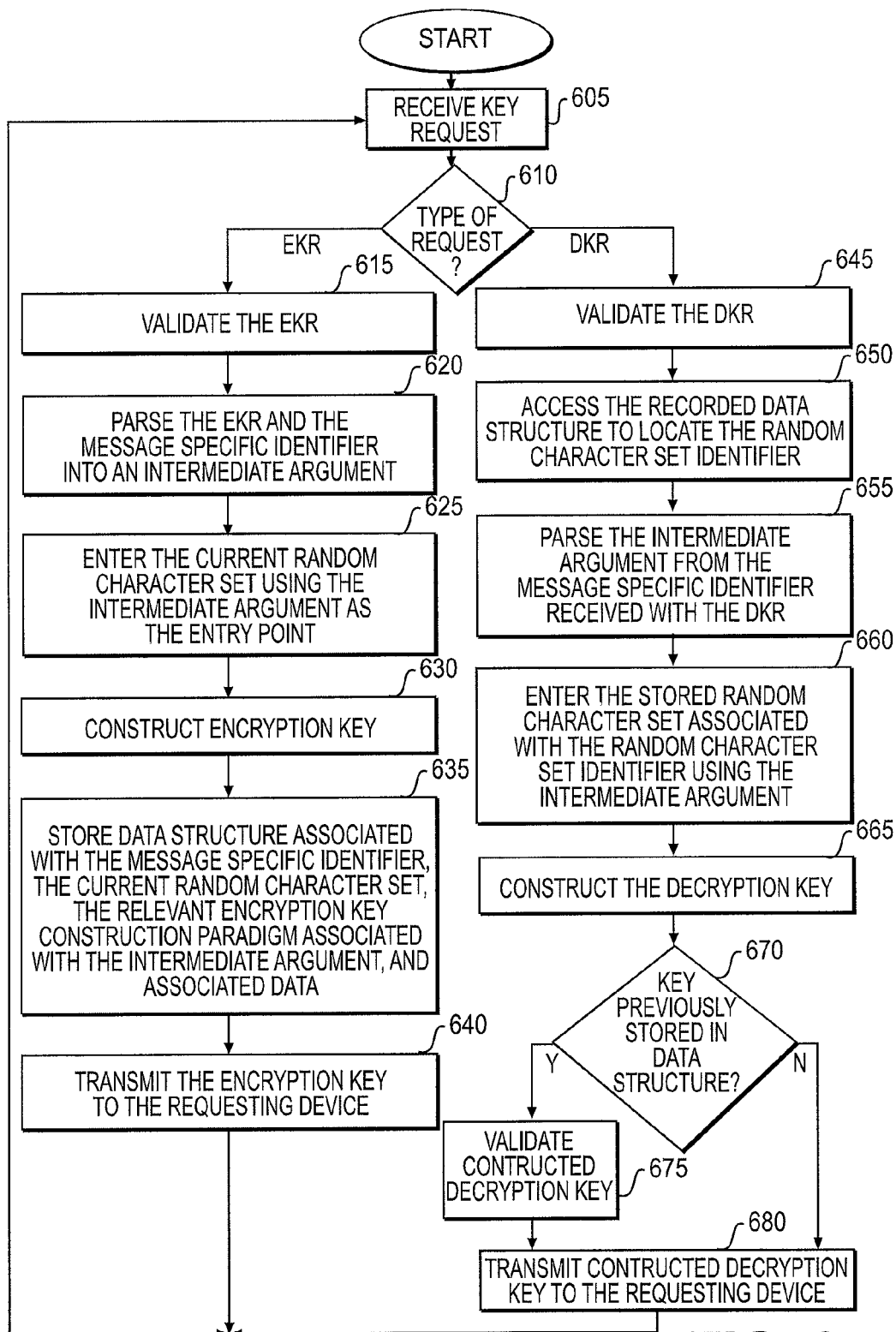
FIG. 6 is a flowchart diagram illustrating exemplary steps of methods performed by a server used to facilitate encryption and decryption of a message being sent and received in a secure manner in accordance with an embodiment of the invention.

Further details on the operation of particular embodiments are illustrated through general flowcharts of FIGS. 4-6. FIGS. 4 and 5 are flowchart diagrams illustrating exemplary steps of a method performed by a device when a message is generated and sent in a secure manner or received and decrypted in a secure manner, respectively. FIG. 6 is a flowchart diagram illustrating exemplary steps of methods performed by a server used to facilitate encryption and decryption of a message being sent and received in a secure manner in accordance with an embodiment of the invention.

Referring now to FIG. 4, method 400 begins at step 405 by composing a message. In one embodiment, this may be accomplished by messaging application 230. At step 410, when the user desires to send the composed message, the user is prompted for login information. In one embodiment, the secure sending module 235 prompts the user to enter login information in the form of a user ID and password (such as a PIN). The user ID and password may be based in part at least on biometric, numeric, alphabetic, alphanumeric or a combination of such characteristics.

At step 415, the method assembles a message specific identifier from one or more attributes associated with the message, and the first device. In one embodiment, the attributes may include a hardware address associated with the first device, a sending address of the message, a recipient address of the message, a chronological attribute, a user ID attribute, a password attribute, and a processing unit component ID attribute. The first address may be a media access control (MAC) address. The chronological attribute may be a time stamp, a date stamp or a time/date stamp associated with the message. The user ID and password attributes may be based in part at least on biometric, numeric, alphabetic, alphanumeric or a combination of such characteristics or merely the first device's pass fail validation of same or the first device's request to the server that it initiate, request and or perform user validation. In more detail, assembling the message specific identifier from one or more of such attributes may involve creating a hash of the attributes to form an information-based indicator that is unique with respect to the message and the first device. In this manner and as described herein, key construction may occur that is predicated on such a message unique identification organic to the message.

At step 420, the method generates an encryption key request (EKR) that incorporates the message specific identifier. At step 425, the EKR is transmitted by the device to a server, which processes the EKR as denoted in FIG. 6. In response to the EKR, an encryption key is received by the device from the server at step 430. The encryption key, as explained in more detail with reference to FIG. 6, is based upon the message specific identifier, a random character set generated and stored within the server. The encryption key is generated using one of a plurality of encryption key construction methods, such as AES, DES or other common encryption methods, algorithms or paradigms known to one skilled in the art. The particular encryption key construction method may be implemented in one or more software modules on the server and may be selected based upon the content of the message specific identifier or, more specifically, an intermediate argument related to the message specific identifier.

At step 435, the message is encrypted with the encryption key. In the illustrated embodiment of FIG. 2, the secure sending module encrypts the message received from server 110, and as noted in FIG. 4, step 440, destroys the encryption key on the sending device. This destructively deletes all trace of the encryption key from the sending device. At step 445, the encrypted message and message specific identifier are provided to the messaging application, such as application 230. In embodiments where the secure sending module and the messaging application are integrated into a single unit, there is no need to push up a layer from the secure sending module. Finally, at step 450, the encrypted message and message specific identifier are sent or transmitted to the intended recipient device.

When securely receiving a message, such as through the exemplary method illustrated in FIG. 5, the device also interfaces with the server to facilitate secure communication over an untrusted network. Referring now to FIG. 5, method 500 begins by receiving a message. In more detail, the received message may be in the form of an encrypted message and a message specific identifier from a sending device. The message specific identifier is associated with one or more attributes associated with the message and the sending device At step 510, the user is prompted for login information. In one embodiment, the secure receiving module 240 prompts the recipient user to enter login information in the form of a user ID and password (such as a PIN). The user ID and password may be based in part at least on biometric, numeric, alphabetic, alphanumeric or a combination of such characteristics. Once it is verified that the user login information is valid (e.g., the recipient device is in the possession and control of the appropriate user of the devices), the module 240 accesses the message and the message specific identifier at step 515.

At step 520, module 240 generates a decryption key request (DKR). In an embodiment, the DKR is based upon the message specific identifier and a second device attribute (e.g., the device specific hardware address for the recipient device, such as the recipient device's media access control (MAC) address). After sending the DKR to the server and after the server has validated the DKR, module 240 receives a decryption key from the server based on the message specific identifier and a stored random character set. At step 535, the module decrypted the encrypted message using the decryption key constructed by the server.

After decryption, the module 240 destroys the decryption key at step 540 as a measure of security. In other embodiments, the recipient device may have enterprise or user defined preferences where the decryption key may be saved permanently in memory storage 215 (e.g., as part of device specific data 245), saved only temporarily in memory storage 215 for a specific period of time, or saved transiently in volatile memory 220 without placement into longer term non-volatile memory storage.

While FIGS. 4 and 5 provide steps for operating devices in embodiments from the device perspective when securely communicating a message using a message specific identifier, FIG. 6 illustrates exemplary steps from a method involved in facilitating secure communication from a server perspective. Referring now to FIG. 6, the overall method of operation 600 involves two main operations—encryption key request serving and decryption key request serving. Method 600 begins at step 605 where the server receives a key request and step 610 determines the type of key request. The key request is based upon a message specific identifier associated with a plurality of attributes associated with the message and the sending device.

If the key request is an encryption key request (EKR), the request is first typically validated in step 615. For example, in one embodiment, the server validates the EKR by validating the sending device's MAC address, user ID and password. If the request is not valid, then operation moves back to step 605 where the server remains ready for the next key request. However, if the request is valid, operation moves to step 620 where the EKR and the message specific identifier are parsed into an intermediate argument. In one embodiment, the intermediate argument is created by transforming the message specific identifier into a functional logical argument.

In step 625, the intermediate argument is used as an entry point into a random character set. Server 110 periodically generates and stores random character sets, each of which may be referenced by a random character set identifier. Thus, step 625 operates to enter the current random character set using the intermediate argument as the entry point into the set. Additionally, the intermediate argument is used to identify one of a plurality of server resident encryption key construction methods, such as AES, DES or other common encryption methods, algorithms or paradigms known to one skilled in the art.

At step 630, the method constructs an encryption key from the current random character set and the entry point of the current random character set and the specified encryption key construction paradigm associated with the intermediate argument. In one embodiment, this encryption key generation is accomplished by the secure communication management module 325 where the key request reception and validation may be performed by the request handling module 330. Those skilled in the art will appreciate that such modules may be implemented together or in distinct modules or hardware that operates in accordance with the steps described in FIG. 6 herein. Additionally, other embodiments may implement modules 325 and 330 as a lower level BIOS-type of firmware within the server 110. As such, server 110 may be deployed in many types of general purpose computing platforms or network communication capable appliances depending upon the anticipated performance requirements of the secure communication system (e.g., number of users, variety of devices, period of generating random character sets, anticipated frequency of secure communication messaging, complexity of the desired encryption/decryption methods, etc.).

At step 635, the method stores a data structure associated with the message specific identifier, a random character set identifier associated with the current random character set, an identifier of the relevant encryption key construction paradigm and associated data related to the generated encryption key (e.g., addressee and recipient information). Optionally, the encryption key itself may be stored in the data structure depending upon the implementation and the desire for other security checks when serving decryption requests (see, e.g., steps 670, 675). In the embodiment illustrated in FIG. 3, the stored data structure appears as server created data structure 335. At step 640, the method transmits the encryption key generated and constructed by the server based upon the message specific identifier to the requesting device before returning to step 605 for the next key request.

Referring back to step 610, if the key request is a decryption key request (DKR), then the method proceeds to step 645 where the DKR is validated before moving on to step 650. In one embodiment, this is accomplished with the DKR conveying a hash of the incoming encrypted message's message specific identifier, the receiving device's MAC address, and the receiving device's user ID and password (e.g., PIN) login information. With this information, the exemplary server is able to ensure that only a recognized device under the control of a recognized user is able to initiate a valid decryption key request.

After initial validation by the server, the method accesses the message specific identifier from the DKR to locate a random character set identifier at step 650. At step 655, the method parses an intermediate argument from the message specific identifier received from the requesting device. In an embodiment, the intermediate argument is a functional logic argument.

At step 660, the intermediate argument is used to enter the stored random character set associated with the random character set identifier located in step 650. In the embodiment of FIG. 3, the secure communication management module 325 employs the intermediate argument to enter the referenced one of the stored random character sets at the position it determines using the intermediate argument as the entry point to the set. In one embodiment, an encryption key construction paradigm is identified in response to a message specific identifier originated intermediate argument. In another embodiment, the encryption key may be retrieved from memory. At step 665, the method constructs a decryption key from the referenced random character set and the identified encryption key paradigm. If the key was previously stored within the relevant recorded data structure associated with the message specific identifier, step 670 may allow for an additional level of validation of the constructed key against the stored key as an additional layer of security at step 675. Otherwise, the method concludes by transmitting the constructed decryption key by the server to the requesting device in step 680 before returning operation to step 605 and awaiting the next key request.

As generally explained above, the methods exemplified in FIGS. 4-6 may operate in an environment that uses devices that securely communicate with each other with use of a server. FIG. 7 is a message flow diagram illustrating exemplary devices 105*a*, 105*b* and an exemplary Communications Encryption Server (CES) 110 in an alternative embodiment that implements the interfaces to the server with BIOS level modules (e.g., module 735, 740). One skilled in the art will also appreciate that reference to MUI in FIG. 7 indicates the type of message specific identifier assembled by device 105*a* and used by CES 110 for encryption and decryption is a message unique identifier (MUI) comprising a hash of attributes (such as the sending device's MAC address, date/time stamp, sender address of the message, recipient address of the message, device microprocessor ID, user ID, PIN or other common message attributes). As generally explained with reference to FIG. 4, device 105*a* may assemble the MUI as a type of message specific identifier organic to the message and associated with message attributes and the sending device (i.e., device 105*a*). As such, the MUI is an information-based indicator that is unique with respect to the message and the sending device, and with which CES 110 may create an encryption key (e.g., using a BIOS resident program 725 and one of a plurality of encryption key construction methods implemented within program 725) for use in encrypting the message. Furthermore, the MUI may be sent with the message, as indicated in FIG. 7, after the BIOS interface sending module 735 encrypts the message, destroys the key, and returns the message to the device message client operating as or part of a messaging application on device 105*a* for subsequent transmission to the recipient device 105*b*.

Figure 7:
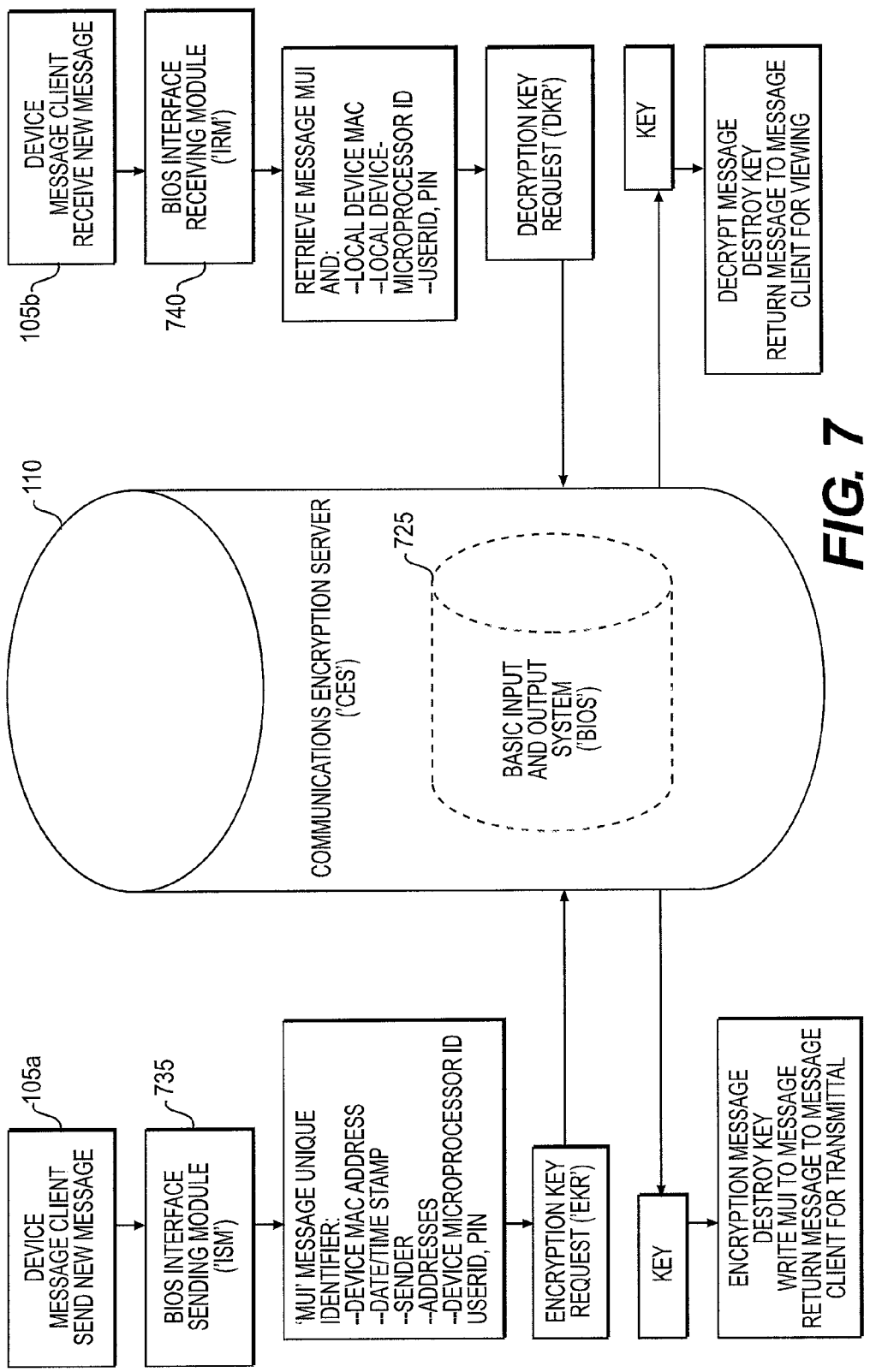
FIG. 7 is a message flow diagram illustrating exemplary devices and servers used in an exemplary BIOS implemented embodiment in accordance with principles of the invention.

In the embodiment illustrated in FIG. 7, the core of the communication encryption BIOS program 725 is a set of executable instructions generally implemented with a set of inputs and outputs. For example, in one embodiment, the BIOS core input may be the MUI based intermediate argument used for encryption and decryption. And BIOS core outputs may include random character set selection, random character set entry point, and an identifier of the relevant BIOS resident encryption key construction paradigm. As such, with the MUI, the BIOS output functions set forth above may be readily and repeatedly reproduced from the MUI based intermediate argument and do not need to be stored in memory. In some embodiments, such information may be stored for ease of retrieval. However, in other embodiments, such information is not stored to help better ensure security against hacking of the stored data structures.

Upon receipt by the device message client operating on device 105*b*, the BIOS interface receiving module 740 may retrieve the message and, along with one or more attributes related to the receiving device (e.g., local device MAC, local device microprocessor ID, recipient user ID, recipient PIN), generate a decryption key request for CES 110 in line with the general steps described in FIG. 5. Thus, CES 110 as shown in FIG. 7 operates as generally explained with reference to FIG. 6 to facilitate secure communication between devices 105*a* and 105*b*, each of which being implemented with BIOS implemented sending and receiving modules shown in FIG. 7.

While the above described embodiments explain the principles of the present invention in terms of two devices and a facilitating server in communication with each of the devices, embodiments of the invention may also be applied to other types of devices and at communication within other types of systems.

At least some portions of exemplary embodiments of the systems, apparatus and methods outlined above may used in association with portions of other exemplary embodiments. Moreover, at least some of the exemplary embodiments disclosed herein may be used independently from one another and/or in combination with one another and may have applications to devices and methods not disclosed herein.

It will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. A method of securely communicating a message between a first device and a second device using a message specific identifier and a server, comprising the steps of:
   receiving an encryption key request server by the server from the first device, wherein the encryption key request is based upon the message specific identifier associated with a plurality of attributes associated with the message and the first device;
   selecting by the server a current one of a plurality of random character sets, each of the random character sets being periodically generated by the server and stored in a memory on the server, each of the random character sets being referenced by a unique random character set identifier;

parsing the encryption key request and the message specific identifier by the server to provide an intermediate argument used to enter the current random character set, the intermediate argument associated with an entry point in the current random character set;

determining, by the server, which of a plurality of encryption key construction paradigms should be used for constructing an encryption key based upon the intermediate argument;

constructing the encryption key by the server from the current random character set, the determined one of the encryption key construction paradigms and the entry point of the current random character set associated with the intermediate argument;

storing a data structure by the server, the data structure being associated with the message specific identifier, the unique random character set identifier associated with the current random character set and an identifier of the determined one of the encryption key construction paradigms; and transmitting the encryption key by the server to the first device.

2. The method of claim 1, wherein the one or more attributes associated with the message specific identifier include at least one from the group comprising a hardware address associated with the first device, a sender address, a recipient address, a chronological attribute, a user ID attribute, a password attribute, and a processing unit component ID attribute.

3. The method of claim 1, wherein the message specific identifier is an information-based indicator that is unique with respect to the message and the first device.

4. The method of claim 1, wherein the steps of selecting, parsing, constructing, storing and transmitting are performed only if the encryption key request is valid.

5. The method of claim 4 further comprising the step of validating the encryption key request by the server based at least upon a first device media access control address.

6. The method of claim 1, further comprising:
receiving, by the server from the second device, a decryption key request and a second device attribute, the decryption key request being based upon the message specific identifier;

determining by the server whether the decryption key request is valid based upon the second device attribute;

if the decryption key request is determined to be valid, accessing the stored data structure by the server to locate the random character set identifier based upon the message specific identifier;

constructing a decryption key by the server from the random character set associated with the random character set identifier stored in the data structure; and transmitting the constructed decryption key from the server to the second device.

7. The method of claim 6, wherein the step of transmitting the constructed decryption key comprises transmitting the constructed decryption key only when the constructed decryption key is validated by the server to be the same as a separately stored decryption key.

8. An apparatus for securely communicating a message between a plurality of devices using a message specific identifier and a server coupled to the devices, comprising:
a processing unit within the server;
volatile memory coupled to the processing unit;
a data communication interface coupled to the processing unit and in operative communication with the plurality of devices, the data communication interface providing an encryption key request and a decryption key request to the processing unit upon respective receipt from one of the devices, the encryption key request and the decryption key request being based upon the message specific identifier, which is associated with a plurality of attributes associated with the message and a sending one of the devices;

a memory storage coupled to the processor, the memory storage maintaining a secure communications management module and a plurality of random character sets, each of the random character sets being periodically generated by the processing unit and maintained on the memory storage, each of the random character sets being referenced by a unique random character set identifier;

wherein, the processing unit is operatively configured, when executing the secure communications management module on the server, to
in response to receipt of the encryption key request from one of the devices,
select a current one of the random character sets,
parse the encryption key request and the message specific identifier to provide an intermediate argument used to enter the current one of the random character sets maintained on the memory storage, the intermediate argument being associated with an entry point in the current one of the random character sets, the intermediate argument also associated with one of a plurality of encryption key construction paradigms resident on the memory storage,
construct an encryption key from the current one of the random character sets, the entry point of the current one of the random character sets associated with the intermediate argument, and the one of the plurality of encryption key construction paradigms,
record a data structure on the memory storage, the data structure being associated with the message specific identifier and the random character set identifier associated with the current one of the unique random character sets, and
provide the encryption key to the data communication interface and cause the encryption key to be transmitted from the server to the one of the devices that sent the encryption key request, and
in response to receipt of the decryption key request from another of the devices,
determine whether the decryption key request is valid,
if the decryption key request is determined to be valid, access the stored data structure on the memory storage to locate the unique random character set identifier based upon the message specific identifier and an identifier of the one of the plurality of encryption key construction paradigms,
construct a decryption key from the one of the random character sets associated with the located unique random character set identifier, and
provide the constructed decryption key to the data communication interface and cause the decryption key to be transmitted from the server to the another of the devices that send the decryption key request.

9. The apparatus of claim 8, wherein the one or more attributes associated with the message specific identifier include at least one from the group comprising a hardware address associated with the one of the devices sending the message, a sender address, a recipient address, a time/date stamp attribute, a user ID attribute, a password attribute, and a processing unit component ID attribute.

10. The apparatus of claim 8, wherein the message specific identifier is an information-based indicator that is unique with respect to the message and the device sending the message.

11. The apparatus of claim 8, wherein the processing unit is further operatively configured, when executing the secure communications management module and in response to receipt of the encryption key request from one of the devices, to determine whether the encryption key request is valid.

12. The apparatus of claim 8, wherein the secure communications management module comprises BIOS software operating within the server.

13. A non-transitory computer readable medium storage on which is stored a set of executable instructions, which when executed on a server perform steps comprising:
   receiving an intermediate argument by the server, the intermediate argument being based upon a message specific identifier associated with a plurality of attributes of a message and a device that communicates with the server, the intermediate argument being transformed from the message specific identifier;
   selecting by the server a current one of a plurality of random character sets, each of the random character sets being periodically generated by the server and stored in a memory on the server, each of the random character sets being referenced by a unique random character set identifier;
   employing the intermediate argument to enter the current one of the random character sets at an entry point of the current one of the random character set associated with the intermediate argument;
   identifying one of a plurality of encryption key construction paradigms based upon the intermediate argument; and
   providing as outputs an identifier of the current one of the random character sets, the entry point of the current one of the random character sets, and an identifier of the one of the plurality of encryption key construction paradigms.

14. The non-transitory computer readable storage medium of claim 13 wherein the set of executable instructions, when executed on the server, perform steps further comprising transforming the message specific identifier into a functional logical argument as the intermediate argument.

15. The non-transitory computer readable storage medium of claim 13 wherein the encryption key construction paradigms are a plurality of different types of encryption methods.

16. The non-transitory computer readable storage medium of claim 13 wherein the set of executable instructions, when executed on the server, perform steps further comprising constructing a key from the identifier of the current one of the random character sets, the random character set entry point, and the identifier of the one of the plurality of encryption key construction paradigms.

17. The non-transitory computer readable storage medium of claim 16 wherein the set of executable instructions, when executed on the server, perform steps further comprising storing a data structure by the server, the data structure being associated with at least the message specific identifier, the identifier of the current one of the random character sets, and the identifier of the one of the plurality of encryption key construction paradigms.

18. The non-transitory computer readable storage medium of claim 17 wherein the set of executable instructions, when executed by the server, perform steps further comprising storing the key in the data structure.

19. The non-transitory computer readable storage medium of claim 13 wherein the set of executable instructions, when executed by the server, perform steps further comprising:
   Locating, by the server, the provided identifier of the random character set in a data structure stored on the server,
   accessing, by the server, the random character set associated with the located identifier of the random character set,
   identifying, by the server, the one of the plurality of encryption key construction paradigms, and
   constructing, by the server, a decryption key from the one of the periodically generated random character sets associated with the located random character set identifier.

20. The non-transitory computer readable storage medium of claim 19 wherein the set of executable instructions, when executed by the server, perform steps further comprising validating, by the server, the constructed decryption key against a stored key.

* * * * *